(12) United States Patent
Mohammad

(10) Patent No.: US 12,130,658 B1
(45) Date of Patent: Oct. 29, 2024

(54) SYNCHRONIZATION OF A TRANSFER OF DATA SIGNALS BETWEEN CIRCUITS WHEN A CLOCK IN A DESTINATION CIRCUIT IS OFF

(71) Applicant: Synopsys, Inc., Mountain View, CA (US)

(72) Inventor: Saleem Chisty Mohammad, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 73 days.

(21) Appl. No.: 18/121,392

(22) Filed: Mar. 14, 2023

Related U.S. Application Data

(60) Provisional application No. 63/320,138, filed on Mar. 15, 2022.

(51) Int. Cl.
*G06F 1/12* (2006.01)
(52) U.S. Cl.
CPC ..................................... *G06F 1/12* (2013.01)
(58) Field of Classification Search
CPC ................................ G06F 1/12; G06F 1/3237
See application file for complete search history.

(56) References Cited

U.S. PATENT DOCUMENTS

| 2002/0087909 | A1* | 7/2002 | Hummel | G06F 13/4217 |
| | | | | 713/400 |
| 2009/0041133 | A1* | 2/2009 | Lin | G06F 13/4226 |
| | | | | 375/257 |
| 2017/0230038 | A1* | 8/2017 | Shin | H04L 7/0331 |

* cited by examiner

*Primary Examiner* — Stefan Stoynov
(74) *Attorney, Agent, or Firm* — Andrew L. Dunlap; Haynes Beffel & Wolfeld LLP

(57) ABSTRACT

A method and system are provided for synchronizing signals, using a synchronizer circuit, between a source circuit and a destination circuit that utilizes detection of when the destination circuit clock is turned off. In the method performed by the synchronizer circuit, a stop signal is received from the destination circuit that is generated upon determination that the destination clock in the destination circuit is turned off. A data signal from the source circuit is, upon receipt of the stop signal, prevented by the synchronizer circuit from being transmitted from the source circuit to the destination circuit. Then once a start signal is received in response to the destination circuit clock signal turning back on, the data signal is once again transmitted from the source circuit to the destination circuit by the synchronizer.

17 Claims, 6 Drawing Sheets

SYNCHRONIZATION OF A TRANSFER OF DATA SIGNALS BETWEEN CIRCUITS WHEN A CLOCK IN A DESTINATION CIRCUIT IS OFF

RELATED APPLICATION

This application claims priority to U.S. Provisional Application No. 63/320,138, filed on Mar. 15, 2022 and titled "Synchronization of Signals When a Destination Domain Clock Is Off", the contents of which are incorporated by reference herein.

TECHNICAL FIELD

The present disclosure relates to digital circuit clocks and electronic design automation (EDA) to develop circuit designs. More particularly, the present disclosure relates to transfer and synchronization of data signals between a source circuit having a source time domain and a destination circuit having a destination time domain.

BACKGROUND

Due to the ever-increasing complexity of new integrated circuit (IC) devices, Electronic Design Automation (EDA) software tools are now considered to be a critical component in the process of converting newly designed electronic systems into a corresponding IC device using one or more IC "chips". That is, IC designers utilize EDA tools to develop an initial IC design (i.e., software description of the IC device) that they believe is capable of implementing a new electronic system, to analyze and modify the initial IC design in order to verify that the final IC design performs the operational objectives set for the new electronic system, and then to generate and check a series of IC layouts (e.g., mask designs or mask layouts) that define a physical IC chip capable of implementing the final IC design. These modern IC devices, such as System-on-Chip (SoC) devices, can comprise billions of individual circuit components, making the use of EDA tools a very practical way to develop and produce modern IC devices.

Some complex IC designs implement multiple clocks. For example, an IC design can involve multiple circuits, such as a source circuit, a processing circuit and a destination circuit, where each circuit can have its own time domain. Accordingly, the IC design can include multiple clock domains according to which the circuits of the IC design operate. For example, there can be multiple clocks according to which signals are received by the destination circuit, processed by the processing circuit and transmitted by the source circuit. EDA tools can be used to design these ICs having multiple clock domains.

SUMMARY

In an embodiment, a method and system in embodiments is provided for synchronizing signals, using a synchronizer circuit, between a source circuit and a destination circuit that utilizes detection of when the destination circuit clock is turned off. The method includes receiving, from the destination circuit, a stop signal in response to a destination clock in the destination circuit turning off, receiving a data signal from the source circuit, preventing transmission of the data signal from the source circuit to the destination circuit in response to receiving the stop signal (e.g., after the stop signal is received), receiving, from the destination circuit, a start signal in response to the destination clock in the destination circuit turning on, and transmitting the data signal from the source circuit to the destination circuit in response to receiving the start signal (e.g., after the start signal is received).

In an embodiment, the method can include transmitting the stop signal to the source circuit, such that the stop signal transmitted to the source circuit is synchronized with a source clock of the source circuit, transmitting the start signal to the source circuit, such that the start signal transmitted to the source circuit is synchronized with the source clock of the source circuit, and synchronizing the transmitting of the data signal received from the source circuit with the destination clock of the destination circuit.

In a further embodiment, the method can include transmitting the stop signal to the source circuit, such that the stop signal transmitted to the source circuit is synchronized with a source clock of the source circuit.

In another embodiment, the method includes synchronizing the transmitting of the data signal received from the source circuit with the destination clock of the destination circuit.

In an embodiment, the preventing of the transmission of the data signal from the source circuit to the destination circuit includes clamping the data signal, and the transmitting of the data signals from the source circuit to the destination circuit includes releasing the clamped data signal to be provided to the destination circuit.

In a further embodiment, a synchronizer is provided between the source circuit and the destination circuit, in response to the stop signal being received by the synchronizer from the destination circuit, the data signal received from the source circuit at an input of the synchronizer is clamped preventing propagation of an output of the data signal from the source circuit to the destination circuit, and in response to the stop signal being provided by the synchronizer to the source circuit, the data signal is clamped at an output of the synchronizer, preventing an output of the source circuit to the destination circuit, in response to the start signal being received by the synchronizer from the destination circuit, the clamping of the data signal received from the source circuit at the synchronizer input stops, so that the data signal is propagated from the source circuit to the destination circuit via the synchronizer, and in response to the start signal being provided from the synchronizer to the destination circuit, the output of the synchronizer enables the data output from the source circuit to be received at the destination circuit.

In another embodiment, the preventing of the transmission of the data signal from the source circuit to the destination circuit, includes clamping the data signal during a time window, such that during the time window the data signal is discarded.

In an embodiment, the preventing of the transmission of the data signal from the source circuit to the destination circuit includes clamping the data signals during a time window such that during the time window the data signal transmission is prevented.

In a further embodiment, the data signal provided from the source circuit to the destination circuit is a multi-bit parallel signal provided to the destination circuit over a bus.

In another embodiment, the data signal includes serial pulses.

In an embodiment, a synchronizer for synchronizing signals between a source circuit and a destination circuit is provided. The synchronizer includes a stop signal input port to receive, from the destination circuit, a stop signal in response to a destination clock in the destination circuit turning off, a data input port to receive a data signal from the source circuit, a data output port to provide the data signal, as received from the source circuit, to the destination circuitry, synchronization circuitry to prevent transmission of the data signal received by the data input port to the data output port in response to the stop signal input port receiving the stop signal (e.g., after the stop signal is received by the stop signal input port), and a start signal input port to receive, from the destination circuit, a start signal in response to the destination clock in the destination circuit turning on, wherein the synchronization circuitry resumes transmission of the data signal received by the data input port to the data output port in response to receiving the start signal (e.g., after the start signal is received).

In a further embodiment, the synchronizer synchronizes the stop signal to a source clock of the source circuit, as the stop signal is transmitted to the source circuit, synchronizes the start signal to the source clock of the source circuit, as the start signal is transmitted to the source circuit, and synchronizes the transmission of the data signal received from the source circuit with the destination clock of the destination circuit.

In an embodiment, the synchronizer synchronizes the stop signal to a source clock of the source circuit, as the stop signal is transmitted to the source circuit.

In another embodiment, the synchronizer synchronizes transmission of the data signal received from the source circuit with destination clock of the destination circuit.

In a further embodiment, upon the stop signal input port receiving the stop signal, the synchronizer clamps the data signal received on the data input port preventing propagation of the data signal, to the destination circuit, on the data output port, upon receiving the stop signal at the stop signal input to the synchronizer, the synchronizer clamps the output of the synchronizer preventing the data from being provided from the data output of the synchronizer to the destination circuit, upon the start signal input port receiving the start signal, the synchronizer stops the clamping of the data signal, so that the data signal is propagated from the source circuit to the destination circuit, and upon receiving the start signal at the start signal input of the synchronizer, the synchronizer will undo clamping to enable the data to be provided from the data output of the synchronizer to the destination circuit.

In an embodiment, the synchronizer is a toggle to pulse device using multiple flip-flops.

In another embodiment, a connection from the data input port to the data output port of the synchronizer is a multi-bit parallel signal provided over a bus.

In a further embodiment, a non-transitory computer readable medium comprising stored instructions is provided. When the instructions are executed by a processor, they cause the processor to control circuitry to receive an input data signal from a source circuit, receive an indication of when a destination circuit clock is on, and toggle to generate a pulse synchronized with the input data signal received from the source circuit and to provide the generated pulse to a destination circuit as an output data signal when the destination clock is on.

In another embodiment, the instructions further cause the processor to control circuitry to gate the input data signal when the destination clock is off, such that the pulse is not provided to the destination circuit.

In an embodiment, the instructions further cause the processor to control circuitry to transmit the stop signal to the source circuit, such that the stop signal transmitted to the source circuit is synchronized with a source clock of the source circuit, transmit the start signal to the source circuit, such that the start signal transmitted to the source circuit is synchronized with the source clock of the source circuit, and synchronize the providing of the output data signal to the destination clock of the destination circuit.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
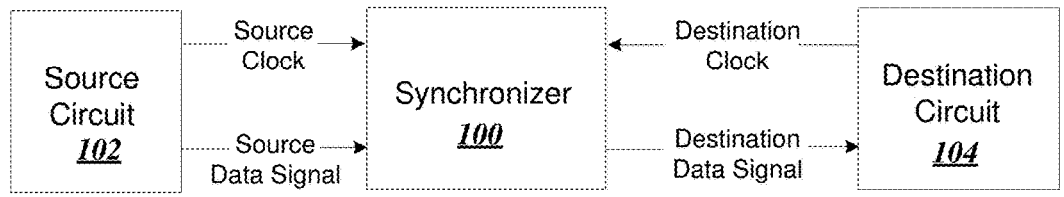
FIG. 1 is a block diagram of a toggle-to-pulse synchronizer that synchronizes an input signal that toggles to generate a pulse into a destination domain, according to some embodiments of the present disclosure.

Aspects of the present disclosure relate to synchronization of a transfer of data (e.g., data signals) between source and destination circuits when a clock in a destination circuit is off. For IC designs that implement multiple clocks (e.g., IC designs that use multiple clocks according to which signals are received, processed and transmitted) a problem can arise when the destination circuit clock stops functioning while data is being received. Handshake based synchronizers assume the destination circuit clock always will be running. However, there will be some use cases where the destination circuit clock could be off. When these synchronizers are used to provide data to a destination circuit while the destination clock is off, they will propagate the source signal to the destination domain when the destination clock starts running again. There are applications where this behavior could cause malfunction of the design. For example, if the signal that is being synchronized is a timestamp, then if it gets propagated when the destination circuit clock starts, it is possible the current time stamp would have changed and the value that is being seen in the destination circuit is not valid anymore.

In order to solve this problem synchronization logic can be implemented to synchronize signals from a source circuit driven by one clock to a destination circuit driven by another clock that accounts for the destination clock being off. In embodiments, a synchronizer detects a destination circuit clock state and makes sure at any time that the latest data value is propagated to the input of the destination circuit only at a time when the destination clock is available.

The embodiments described herein solve the problems occurring when the destination circuit clock turns off by providing logic in the destination circuit that generates a stop signal indicating when the destination circuit clock is turned off and further generating a start signal when the destination circuit clock turns back on. The stop signal is provided to the synchronizer which clamps the data being transmitted from the source to the destination through the synchronizer. Similarly, when the start signal is received by the synchronizer the clamping is undone so that the data can be transmitted through the synchronizer to the destination circuit once again.

Synchronization circuitry described herein that accounts for the destination clock being off can be provided in different types of synchronizers. For example, if a data signal transmitted from the source to the domain is a pulse, then a handshake-based synchronizer can be used which will ensure a pulse is generated in the destination with different clocks in the source and destination remaining synchronized even if the destination clock is turned off at times. If the signal is a non-pulse type, a synchronizer that registers the signal through a chain of flip flops working in destination domain can be used. If the signal is bus vector, then a handshake-based synchronizer, similar to a synchronizer used in with a pulsed signal, can be used which will ensure input signal vector value is propagated to the destination with clock signals between the source and drain being synchronized even if the destination clock is turned off at times.

The handshake-based synchronizers assume that the destination clock will always be running. However, there may be some situations where the destination clock could be off due to clock clamping. During the clock clamping, also referred to as gating, the data received is either discarded or blocked from transmission. When the above-described synchronizers are used anyway during such clamping in this context, they may propagate input signals to the destination circuit when the destination clock starts running again. There are applications where this behavior could cause a malfunction of the design. For example, if the signal that is being synchronized is a timestamp, then if it gets propagated when the destination clock starts, it is possible that the current time stamp would have changed and the value that is being seen in the destination circuit is not valid anymore, until the latest input is propagated. In this scenario a correct design would have been to detect the destination clock state and ensure that at any time the latest input value is propagated to the destination domain whenever the destination clock is available.

In embodiments described herein, the synchronizer design ensures that if the destination clock is off, stale input values will not be propagated when the destination clock eventually starts. The benefit of such a design is that it can prevent stale input signals (e.g., pulses) from propagating to the destination circuit when the destination clock eventually starts. As pointed out above, stale values can lead to functional problems.

In some implementations, a destination clock may be purposely turned off to save power, for example. While the destination clock is off, signals (e.g., input pulses from a source) are generally not to be transmitted into the destination domain. Such signals should be discarded as being stale and outdated.

In embodiments, a synchronizer design can utilize a stop signal from the destination circuit that will go to a high value when the destination clock needs to be gated. This stop signal is transmitted by the synchronizer and is synchronized to the source circuit and the data output from the source circuit is synchronized by the synchronizer circuit and transmitted back to the destination domain. This stop signal remains asserted until a signal indicating a synchronized-to-source domain condition, and subsequently a condition of being synchronized back to the destination domain, is observed high. Then the stop signal will go low. If the stop signal is observed to go low in the destination domain, then the destination clock will be gated. A similar function is performed on a start signal when the destination clock starts again. In the source domain, whenever the stop signal is observed to go high, it will clamp the input so that no new value is propagated. In the destination domain, when the stop signal is high, the output of the synchronizer is clamped (e.g., ignored). In the source domain, when the start signal is observed to go high, it will undo the clamping and start to propagate new values. In the destination domain, when the start signal is high, the output of the synchronizer will be ignored. The timing of these signals is described in more detail below with reference to FIG. 5 In this way the circuit logic ensures that no stale value is sampled in the destination domain when the destination clock restarts. If the signal that is being synchronized is a multi-bit vector, then the similar implementation of stop and start signals, will be used in a bus (multi-bit) synchronizer, as described below.

FIG. 1 is a block diagram of a toggle-to-pulse synchronizer that synchronizes an input signal that toggles to generate a pulse into a destination domain, according to some embodiments of the present disclosure. The circuit includes synchronizer circuit 100, a source circuit 102 and a destination circuit 104. The synchronizer 100 receives a source clock (signal) as well as a data signal from the source circuit 102. The synchronizer 100 further receives a destination clock (signal) as well as transmits a data signal from and to the destination circuit 104.

The synchronizer 100 functions in part to receive an input data signal from the source circuit 102 and then to generate and transmit an output data signal (i.e., the destination data signal) to the destination circuit 104 as well as synchronize the output data signal to the destination clock. The synchronizer 100 can be a toggle-to-pulse synchronizer. A toggle-to-pulse synchronizer generates a data signal from data output from the source circuit 102 by toggling, upon receipt of a source data signal, to create a pulse. Such a toggling to generate a pulse is performed using a series of flip-flops. The pulse generated by the synchronizer 100 is then synchronized in the synchronizer 100 with the destination clock and transmitted to the destination circuit 104. The pulses generated can be serial pulses. A similar process is followed by the synchronizer 100 to generate pulses based upon signals received from the destination circuit 104 (not shown in FIG. 1) for transmitting to the source circuit 102.

A toggle input signal at an input to the synchronizer 100 is synchronized internal to the synchronizer for transmission to, for example, to the destination circuit 104, by registering into the destination circuit 104 using the flip-flops in the synchronizer 100 to clear a meta-stable window. The flip-flops operate according to the destination clock. Final two flip-flops in a series can generate a pulse that is then transmitted to the destination circuit 104. This is the general operation of a toggle-to-pulse synchronizer.

Figure 2:
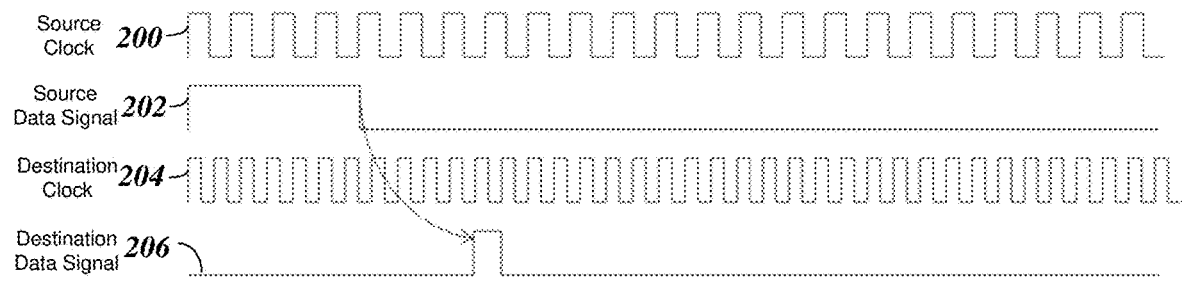
FIG. 2 is a timing diagram of a toggle-to-pulse synchronizer, according to some embodiments of the present disclosure.

FIG. 2 is a timing diagram of a toggle-to-pulse synchronizer of FIG. 1, according to some embodiments of the present disclosure. Specifically, FIG. 2 illustrates generation of a pulse by the synchronizer 100 from a data signal provided from source circuit 102. A source clock (signal) 200 and destination clock 204 are shown in FIG. 2 along with a source data signal 202 and a resulting destination data signal (e.g., a data pulse) 206. The synchronizer 100 receives the source data signal 202 and generates the destination data signal 206 with the synchronizer 100 being implemented as a toggle-to-pulse type synchronizer. The destination data signal 206 that is generated from the synchronizer 100 is provided to the destination circuit 104 in synchronization with the destination clock 204. The source data signal 202 is therefore propagated to the destination circuit 104 as a pulse.

Figure 3:
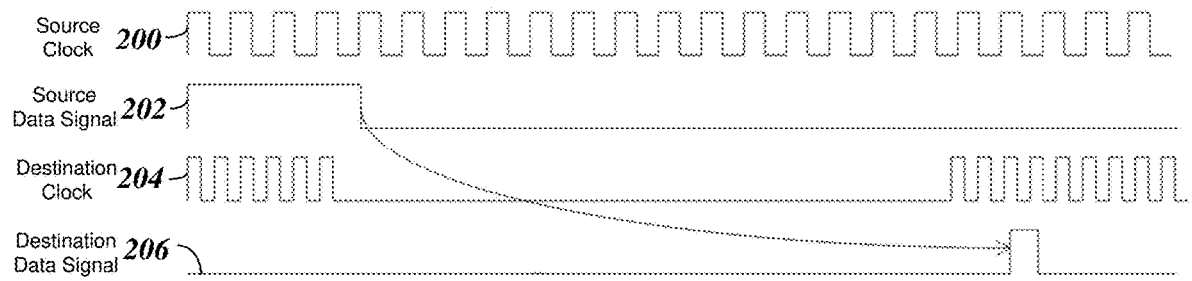
FIG. 3 is a timing diagram of a toggle-to-pulse synchronizer during the time that the destination clock is on, after it was off for a relatively long time, according to some embodiments of the present disclosure.

FIG. 3 is a timing diagram of a toggle-to-pulse synchronizer during the time that the destination clock is on, after it was off for a relatively long time, according to some embodiments of the present disclosure. Specifically, FIG. 3 illustrates what happens after the destination data signal 206 generated by the synchronizer 100 is unable to be transmitted for a long period of time (e.g., a longer period of time than illustrated in FIG. 2), because the destination clock 204 is turned off. As shown in FIG. 3, the destination clock 204 does not provide signal pulses for a significant period of time. The synchronizer 100 can be configured, such that the destination data signal 206 can only be synchronized and transmitted from the synchronizer 100 to the destination circuit 104, when the destination clock 204 is providing pulses (e.g., the destination clock is turned on and operating). So, as shown in FIG. 3, transmission of the destination data signal 206 generated by the synchronizer 100 is significantly delayed due to the destination clock 204 being off for a period of time.

Since the destination clock 204 was off during the time that the input source signal 202 toggled, the data signal 204 could not be generated. When eventually the destination clock 204 restarted, the source data signal 202 from source circuit 102 is propagated and then the destination data signal 206 includes a pulse generated by the synchronizer 100 in response. In some applications these late pulses coming into the destination circuit 104 may result in functional problems.

Figure 4:
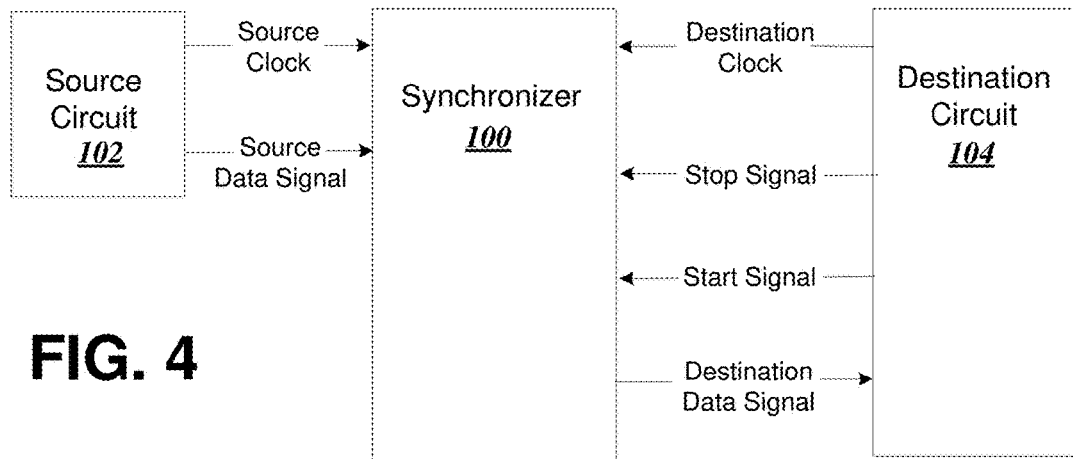
FIG. 4 is a block diagram of a toggle-to-pulse synchronizer that synchronizes an input signal that toggles to generate a pulse into a destination domain when if the destination clock is on, according to some embodiments of the present disclosure.

FIG. 4 is a block diagram of a toggle-to-pulse synchronizer that synchronizes an input signal that toggles to generate a pulse into a destination domain when if the destination clock is on, according to some embodiments of the present disclosure. Specifically, FIG. 4 illustrates the synchronizer 100 with added stop and start signals generated by the destination circuit 104 in accordance with embodiments. The circuit of FIG. 4 includes the same components as FIG. 1 that generate the same signals, but the circuit of FIG. 4 further adds the stop and start signals from the destination circuit 104 to the synchronizer 100. The start signal is generated by the destination circuit 104 and indicates that the destination clock (i.e., the clock of the destination circuit 104) is on. The synchronizer 100 then functions to synchronize an input source circuit data signal that toggles to generate a destination signal pulse only if the destination clock is on. Before the destination clock stops, the destination circuit 104 sends a stop request (e.g., stop signal) to the synchronizer 100. This stop signal is then synchronized to the source clock domain (i.e., the time domain of the source circuit 102) and is then provided to the source circuit 102. The source data signal output from the source circuit 102 to the synchronizer 100 is then synchronized back to the destination clock domain (i.e., the time domain of the destination circuit 104). For example, the stop signal and the start signal may be generated in a circuit in the destination domain. Then the stop signal generated by the destination circuit 104 is then transmitted through the synchronizer 100 and is synchronized and provided to the source circuit 102 in the time domain of the source circuit 102.

In the synchronizer 100, when the stop signal is detected, the synchronizer 100 logic can clamp the source data signal so that any toggle on the source data signal from the source circuit 102 is dropped (e.g., discarded). From the time the stop signal is asserted by the destination circuit 104 and provided to the source circuit 102, the destination circuit 104 may drop any pulses (data signals) received due to the inflight toggle that occurs when the destination clock is preparing to stop.

When the destination clock restarts at a later point in time, the destination circuit 104 sends a start signal. This start signal is synchronized by the synchronizer 100 to the clock of the source circuit 102 and is then transmitted to the source circuit 102 by the synchronizer 100. Once the start signal is detected in the synchronizer 100, the synchronizer logic begins to look for an input signal (the source data signal) from the source circuit 102 to toggle again to trigger creation of a pulse to synchronize and provide to the destination circuit 104 in the time domain of the destination circuit 104. After this, any input toggle, if synchronized as a pulse into the destination domain, will be transmitted from the synchronizer 100 to the destination circuit as the destination data signal.

Figure 5:
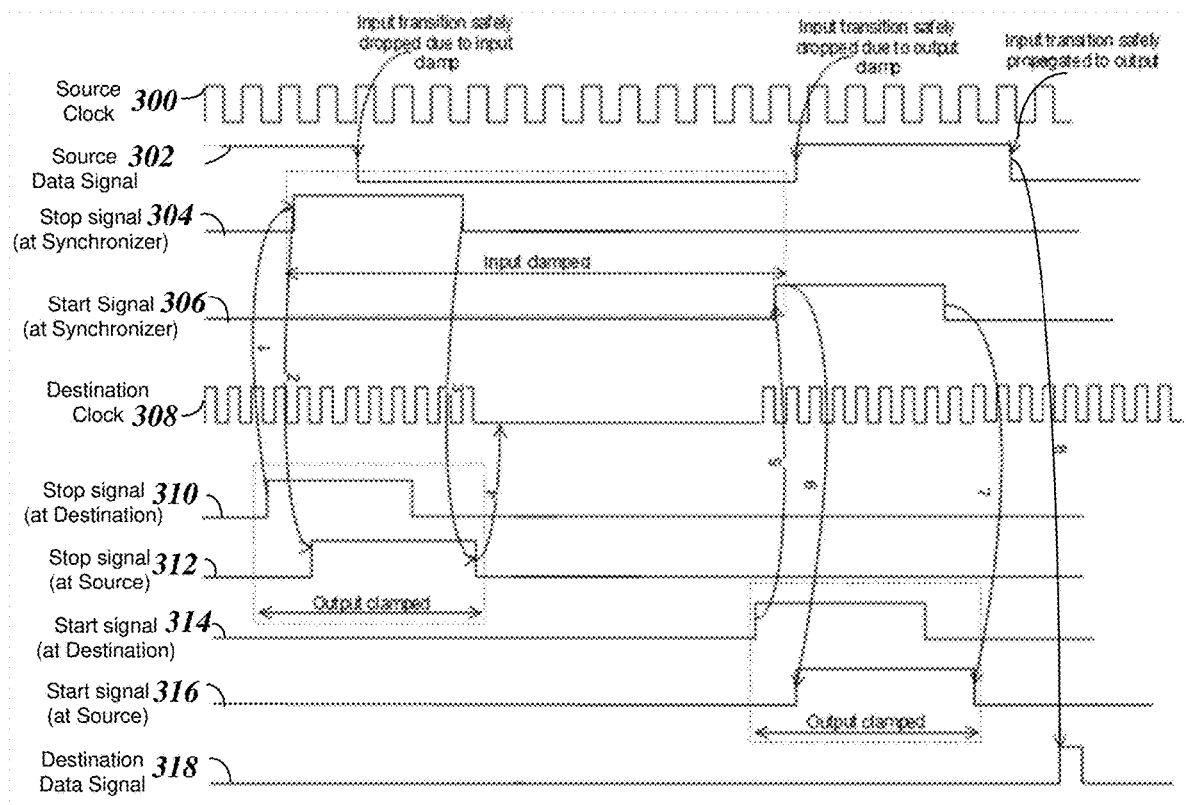
FIG. 5 is a timing diagram illustrating the behavior of a toggle-to-pulse synchronizer output pulse, according to some embodiments of the present disclosure.

FIG. 5 is a timing diagram illustrating the behavior of a toggle-to-pulse synchronizer output pulse, according to some embodiments of the present disclosure. Specifically, FIG. 5 illustrates the timing diagram that can be implemented by the circuit of FIG. 4. The timing diagram illustrates the behavior of the synchronizer 100 that, with the start and stop signals received from the destination circuit 102, would otherwise result in dropping or discarding an input source signal toggle (i.e., the source data signal) when the destination clock is off. The regions marked as clamped (outlined with dashed rectangles) are the windows where transitions of data signals from the source circuit 102 and signals provided to the destination circuit 104 are clamped in the synchronizer 100 so that the signals are dropped.

Referring to FIG. 5, a listing of the timelines is provided below. Specifically, FIG. 5 illustrates a source clock (signal) 300 and a destination clock (signal) 308, with the destination clock 308 experiencing a period of time where there are no pulses (e.g., the destination clock 308 is off). A source data signal 302 is provided from the source circuit 102 to the synchronizer 100. A stop signal 304 at the synchronizer is received by the synchronizer 100 from the destination circuit 104. A start signal 306 at the synchronizer is received by the synchronizer 100 from the destination circuit 104. A stop signal 310 at the destination is provided from the destination circuit 104. A stop signal 312 at the source is a stop signal received at the source circuit 102 as originally provided from the destination circuit 104 through the synchronizer 100 and synchronized to the time domain of the source circuit 102. A start signal 314 at the destination is provided by the destination circuit 104. A start signal 316 at the source is a start signal received at the source circuit 102 as originally provided from the destination circuit 102 through the synchronizer 100 and synchronized to the time domain of the source circuit 102. The destination data signal 318 is the pulse generated within the synchronizer 100 and provided to and received by the destination circuit 104.

The arcs, or curves with arrows, describe in more detail the interrelation between the timing diagrams. Arc 1 shows the stop signal 104 asserted from the destination circuit and provided to the synchronizer 100. Arc 2 shows the stop signal 312 provided from the synchronizer 100 back to the source circuit 102. Arc 3 shows the stop signal 304 de-assertion as provided from the synchronizer 100 to the source circuit 102 and the stop signal 312 de-assertion. Arc 4 shows confirmation of the stop when the destination clock 308 is off. Arc 5 shows the start signal 314 asserted from the destination circuit 104 to the synchronizer 100 and the subsequent start signal 306 at the synchronizer 100. Arc 6 shows the start signal 316 provided through the synchronizer 100 to the source circuit 102. Arc 7 shows the start signal 306 de-assertion at the synchronizer 100 and then the start signal 316 de-assertion at the source 102. Arc 8 shows the pulse 318 generated by the synchronizer 100 in response to a toggle from the source data signal 102, with the pulse being provided to the destination circuit 104 after a window of time when the destination clock 308 is restarted.

Figure 6:
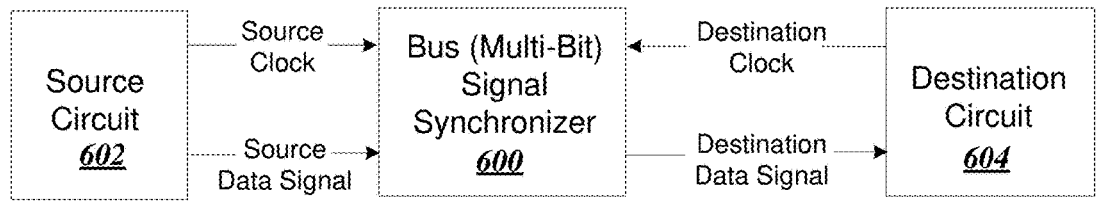
FIG. 6 is a block diagram of a synchronizer that transmits a multi-bit input bus data signal from a source circuit to a destination circuit, according to some embodiments of the present disclosure.

FIG. 6 is a block diagram of a synchronizer 600 that transmits a multi-bit input bus data signal from a source circuit 602 to a destination circuit 604, according to some embodiments. The circuit of FIG. 6 is similar to FIG. 1, except that instead of a serial transmission line signal the FIG. 6 circuit uses a parallel data interface bus. Redundant descriptions of FIG. 6, with respect to FIG. 1, are omitted herein. Parallel ports send multiple bits of data at once, as opposed to serial communication, in which bits are sent one at a time. To do this, parallel ports may require multiple data lines in their cables and port connectors.

The block diagram of FIG. 6 illustrates that a bus synchronizer 600 receives a multi-bit input source data signal from a source circuit 602 and a new destination data signal is propagated into the destination circuit 604. The bus synchronizer 600 also receives a source clock that is based on a source time domain and a destination domain clock that is based on a destination time domain. There may be additional reset pins to reset the bus synchronizer 600. The bus synchronizer 600 can detect the change in the source data signal toggling and generate a pulse to provide the destination data signal to the destination circuit 604 in response.

Figure 7:
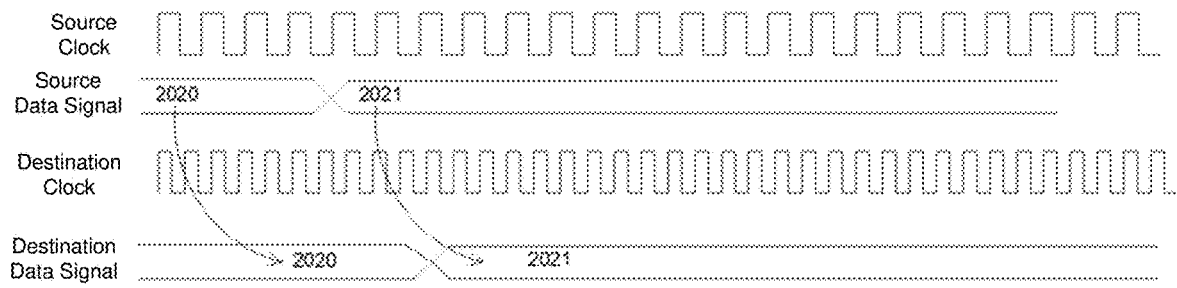
FIG. 7 shows a timing diagram for the circuit of FIG. 6, according to some embodiments of the present disclosure.

FIG. 7 shows a timing diagram for the circuit of FIG. 6. The timing diagram includes similar timing signals to those of FIG. 2, with the exception that the source data signal and the destination signal are bus signals. Redundant descriptions of FIG. 7, with respect to FIG. 2, are omitted herein. The bus signal 2020 (source data signal) is provided to the bus synchronizer 600 from the source circuit 602 and transitions to a bus signal 2021 (source data signal). The bus signal 2020 (destination data signal) and the bus signal 2021 (destination data signal) are received by the destination circuit 604, as illustrated. Thus, received multi-bit signals are propagated to the destination domain of the destination circuit 604 as a multi-bit synchronous destination signal.

Figure 8:
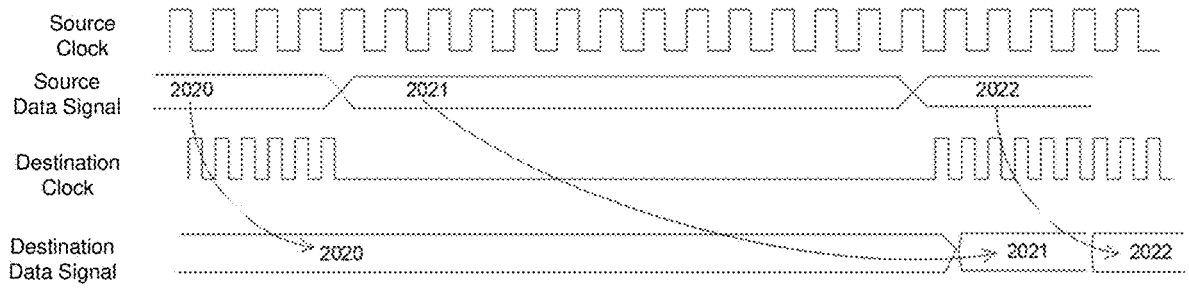
FIG. 8 is a timing diagram of a bus synchronizer where the destination clock is off for a period of time, according to some embodiments of the present disclosure.

FIG. 8 is a timing diagram of a bus synchronizer 600 where the destination clock is off for a period of time. The circuit of FIG. 8 is similar to that of FIG. 3, except in FIG. 8 parallel bit signals are sent over a bus connecting the synchronizer 600 and the source circuit 602 and destination circuit 604. Redundant descriptions of FIG. 8, with respect to FIG. 3, are omitted herein. The timing diagram of FIG. 8 illustrates the problematic behavior of the bus synchronizer 600 when the data signal from the source circuit 602 is propagated to the destination circuit 604 when the destination clock is on after it was off for a relatively long time. Since the destination clock was off during the time the input source bus signal 2020 changed to bus signal 2021, and the signal did not propagate to the destination circuit 604 immediately. When eventually the destination clock restarted, the signal is propagated and then a new data value 2022 was generated prior to completion of transmission of the data signals 2021. In some applications, these late input signal transitions may result in functional problems.

Figure 9:
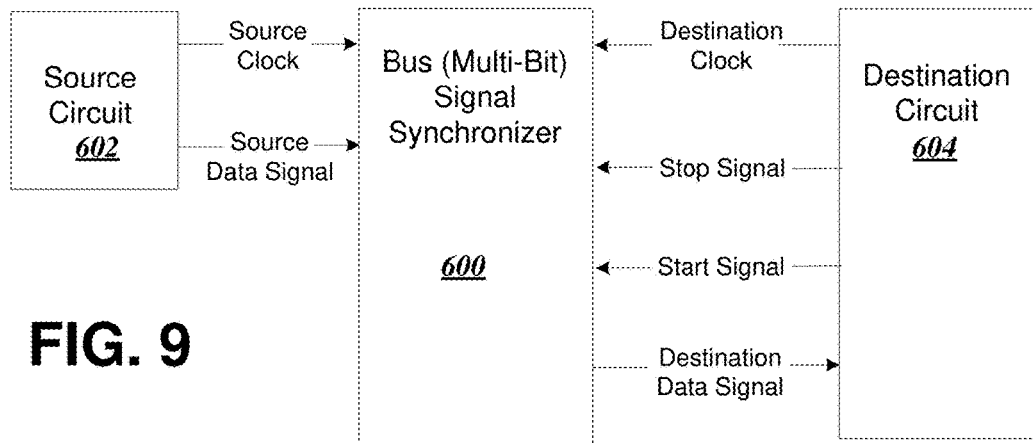
FIG. 9 is a block diagram of a synchronizer that synchronizes a multi-bit input bus source signal that adds start and stop signals from the destination circuit 604, according to some embodiments of the present disclosure.

FIG. 9 is a block diagram of a bus synchronizer 600 that synchronizes a multi-bit input bus source signal that adds start and stop signals from the destination circuit 604. FIG. 9 is similar to the circuit of FIG. 4 except the circuit of FIG. 4 has a single serial transmission line instead of a bus. Redundant descriptions of FIG. 9, with respect to FIG. 4, are omitted herein. As with FIG. 4, in FIG. 6 the synchronizer 600 will generate a pulse if the destination clock is on by utilizing the start and stop signals to determine when the destination source clock of the destination circuit 604 is running.

Figure 10:
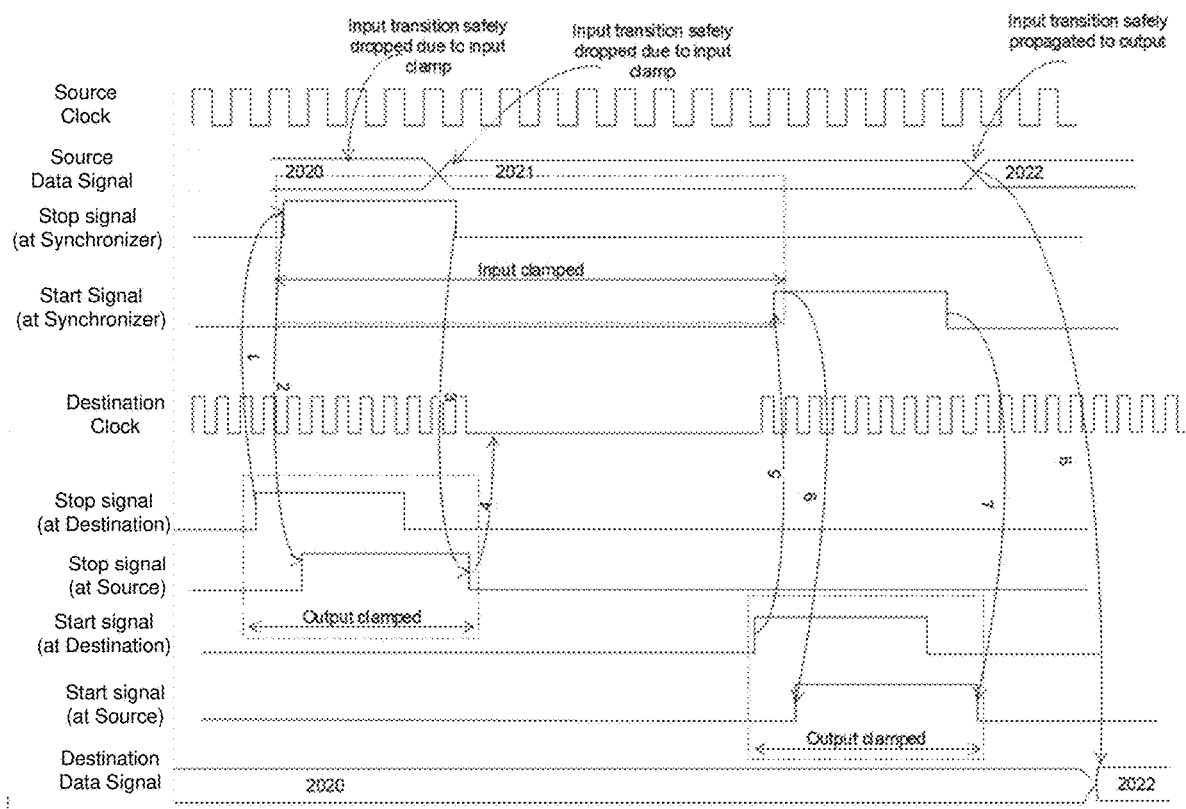
FIG. 10 is a timing diagram illustrating the behavior of the circuit of FIG. 9, according to some embodiments of the present disclosure.

FIG. 10 is a timing diagram illustrating the behavior of the circuit of FIG. 9. The timing diagram of FIG. 10 is similar to that of FIG. 5 except the data signals being provided are parallel bus signals. Redundant descriptions of FIG. 10, with respect to FIG. 5, are omitted herein. The arcs 1-8 show in detail the interrelation between the timing diagram signals. Arc 1 shows the stop signal asserted from the destination circuit 604 that is provided to the synchronizer 600. Arc 2 shows the stop signal provided from the synchronizer 600 to the source circuit 602. Arc 3 shows the stop signal de-assertion getting through the synchronizer 600 and provided to the source circuit 602. Arc 4 shows confirmation that the source circuit 602 has received the stop signal and that the destination clock has turned off. Arc 5 shows the start signal generated at the destination circuit 604 provided to the synchronizer 600. Arc 6 shows the start signal being provided from the synchronizer 600 to the source circuit 602. Arc 7 shows de-assertion of the start signal being provided from the synchronizer 600 to the source circuit 602. Arc 8 shows the data bus signal change 2022 when provided to the destination circuit 600, and the fact that the earlier data transition 2021 occurring during the clamping between the start and stop signals did not propagate to cause errors.

Figure 11:
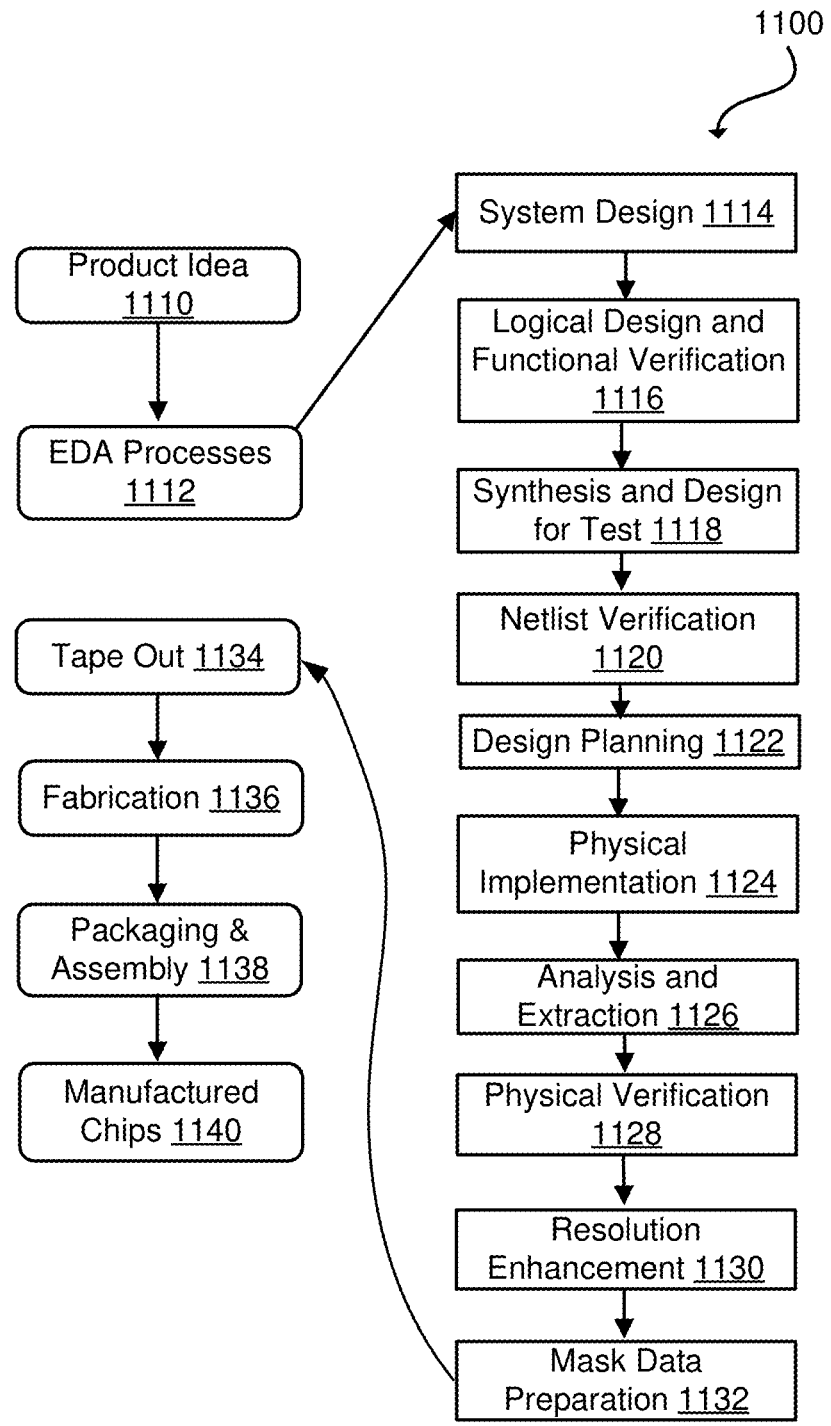
FIG. 11 is a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations.

The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a less detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12) may be used to store the programs and data structures that are used by some or all of the EDA products described herein, and products used for development of cells for the library and for physical and logical design that use the library.

Figure 12:
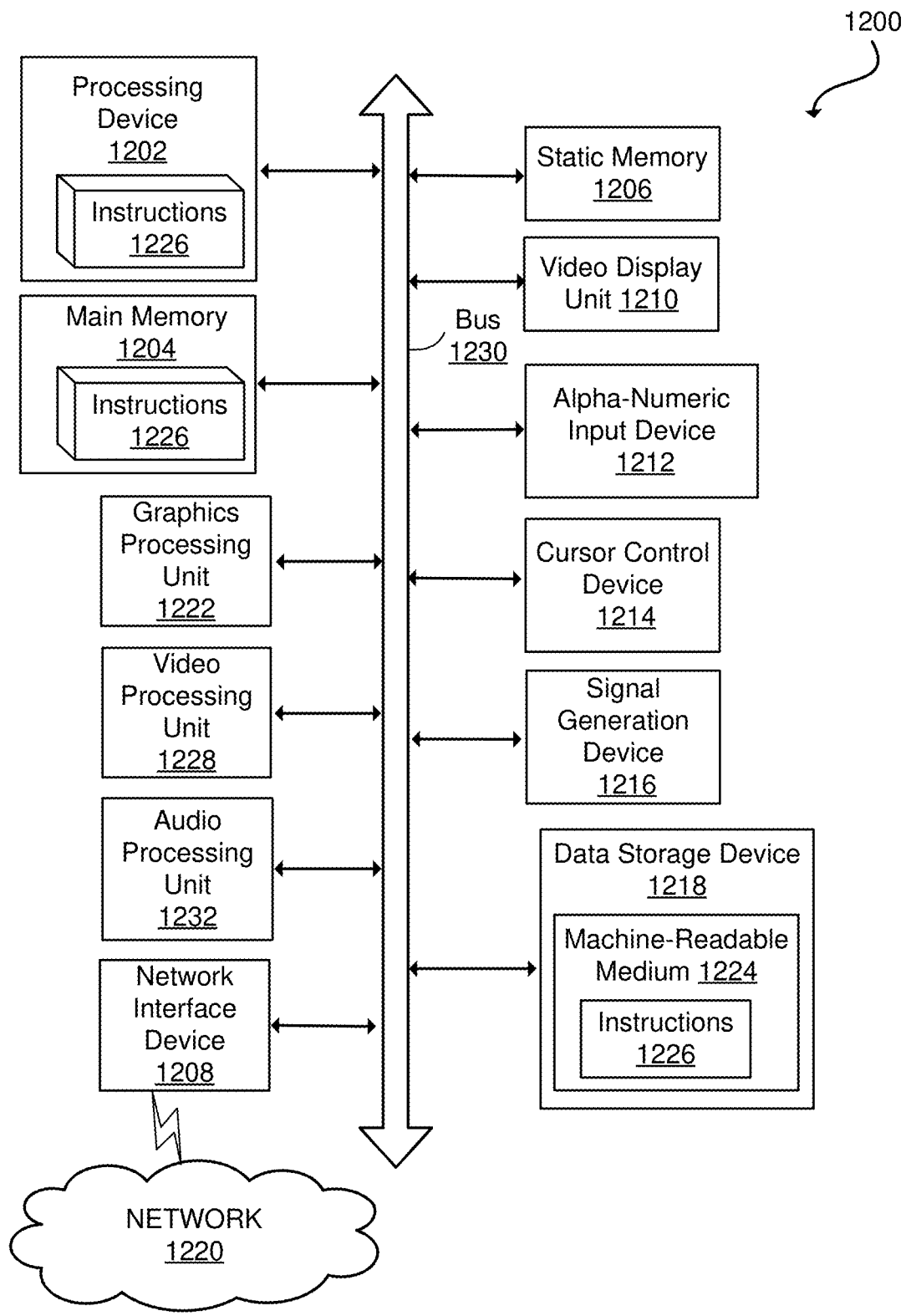
FIG. 12 illustrates an example computer system in which embodiments may operate.

FIG. 12 illustrates an example computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:
1. A method for synchronizing signals between a source circuit and a destination circuit, the method comprising:
 receiving, from the destination circuit, a stop signal in response to a destination clock in the destination circuit turning off;

receiving a data signal from the source circuit;
preventing transmission of the data signal from the source circuit to the destination circuit in response to receiving the stop signal;
receiving, from the destination circuit, a start signal in response to the destination clock in the destination circuit turning on; and
transmitting the data signal from the source circuit to the destination circuit in response to receiving the start signal.

2. The method of claim 1, further comprising:
transmitting the stop signal to the source circuit, such that the stop signal transmitted to the source circuit is synchronized with a source clock of the source circuit;
transmitting the start signal to the source circuit, such that the start signal transmitted to the source circuit is synchronized with the source clock of the source circuit; and
synchronizing the transmitting of the data signal received from the source circuit with the destination clock of the destination circuit.

3. The method of claim 1, further comprising:
transmitting the stop signal to the source circuit, such that the stop signal transmitted to the source circuit is synchronized with a source clock of the source circuit.

4. The method of claim 1, further comprising:
synchronizing the transmitting of the data signal received from the source circuit with the destination clock of the destination circuit.

5. The method of claim 1,
wherein the preventing of the transmission of the data signal from the source circuit to the destination circuit comprises clamping the data signal, and
wherein the transmitting of the data signals from the source circuit to the destination circuit comprises releasing the clamped data signal to be provided to the destination circuit.

6. The method of claim 1,
wherein a synchronizer is provided between the source circuit and the destination circuit,
wherein, in response to the stop signal being received by the synchronizer from the destination circuit, the data signal received from the source circuit at an input of the synchronizer is clamped preventing propagation of an output of the data signal from the source circuit to the destination circuit,
wherein, in response to the stop signal being provided by the synchronizer to the source circuit, the data signal is clamped at an output of the synchronizer, preventing an output of the source circuit to the destination circuit,
wherein, in response to the start signal being received by the synchronizer from the destination circuit, the clamping of the data signal received from the source circuit at the synchronizer input stops, so that the data signal is propagated from the source circuit to the destination circuit via the synchronizer, and
wherein, in response to the start signal being provided from the synchronizer to the destination circuit, the output of the synchronizer enables the data output from the source circuit to be received at the destination circuit.

7. The method of claim 1,
wherein the preventing of the transmission of the data signal from the source circuit to the destination circuit, comprises clamping the data signal during a time window, such that during the time window the data signal is discarded.

8. The method of claim 1,
wherein the preventing of the transmission of the data signal from the source circuit to the destination circuit comprises clamping the data signals during a time window such that during the time window the data signal transmission is prevented.

9. The method of claim 1,
wherein the data signal provided from the source circuit to the destination circuit is a multi-bit parallel signal provided to the destination circuit over a bus.

10. The method of claim 1, wherein the data signal includes serial pulses.

11. A synchronizer for synchronizing signals between a source circuit and a destination circuit, the synchronizer comprising:
a stop signal input port to receive, from the destination circuit, a stop signal in response to a destination clock in the destination circuit turning off;
a data input port to receive a data signal from the source circuit;
a data output port to provide the data signal, as received from the source circuit, to the destination circuitry;
synchronization circuitry to prevent transmission of the data signal received by the data input port to the data output port in response to the stop signal input port receiving the stop signal; and
a start signal input port to receive, from the destination circuit, a start signal in response to the destination clock in the destination circuit turning on,
wherein the synchronization circuitry resumes transmission of the data signal received by the data input port to the data output port in response to receiving the start signal.

12. The synchronizer of claim 11, wherein the synchronizer:
synchronizes the stop signal to a source clock of the source circuit, as the stop signal is transmitted to the source circuit;
synchronizes the start signal to the source clock of the source circuit, as the start signal is transmitted to the source circuit; and
synchronizes the transmission of the data signal received from the source circuit with the destination clock of the destination circuit.

13. The synchronizer of claim 11, wherein the synchronizer:
synchronizes the stop signal to a source clock of the source circuit, as the stop signal is transmitted to the source circuit.

14. The synchronizer of claim 11, wherein the synchronizer:
synchronizes transmission of the data signal received from the source circuit with destination clock of the destination circuit.

15. The synchronizer of claim 11,
wherein, upon the stop signal input port receiving the stop signal, the synchronizer clamps the data signal received on the data input port preventing propagation of the data signal, to the destination circuit, on the data output port,
wherein, upon receiving the stop signal at the stop signal input to the synchronizer, the synchronizer clamps the output of the synchronizer preventing the data from being provided from the data output of the synchronizer to the destination circuit,
wherein, upon the start signal input port receiving the start signal, the synchronizer stops the clamping of the data signal, so that the data signal is propagated from the source circuit to the destination circuit, and wherein upon receiving the start signal at the start signal input of the synchronizer, the synchronizer will undo clamping to enable the data to be provided from the data output of the synchronizer to the destination circuit.

16. The synchronizer of claim 15, wherein the synchronizer is a toggle to pulse device using multiple flip-flops.

17. The synchronizer of claim 11, wherein a connection from the data input port to the data output port of the synchronizer is a multi-bit parallel signal provided over a bus.

* * * * *